United States Patent [19]
Sun

[11] Patent Number: 6,111,986
[45] Date of Patent: Aug. 29, 2000

[54] METHOD AND APPARATUS FOR GENERATING ADDRESSES

[75] Inventor: Alex Hung-Pin Sun, San Jose, Calif.

[73] Assignee: Adaptec, Inc., Milpitas, Calif.

[21] Appl. No.: 09/238,106

[22] Filed: Jan. 27, 1999

Related U.S. Application Data

[63] Continuation of application No. 08/620,266, Mar. 22, 1996, Pat. No. 5,893,169.

[51] Int. Cl.[7] ............................... G06K 9/46; G06F 9/26
[52] U.S. Cl. ............................. 382/232; 711/211
[58] Field of Search .................... 711/211, 217, 711/218, 204, 206, 213, 214; 360/49, 78.14; 382/232, 233, 234

[56] References Cited

U.S. PATENT DOCUMENTS

| | | | |
|---|---|---|---|
| 4,901,318 | 2/1990 | Tomisawa | 360/48 |
| 5,408,477 | 4/1995 | Okada et al. | 371/40.1 |
| 5,412,667 | 5/1995 | Havemose | 371/37.4 |
| 5,465,261 | 11/1995 | Deschene | 395/438 |
| 5,487,146 | 1/1996 | Guttag et al. | 395/166 |
| 5,517,631 | 5/1996 | Nachado et al. | 371/40.1 |
| 5,627,844 | 5/1997 | Cho | 371/39.1 |
| 5,640,286 | 6/1997 | Acosta et al. | 371/37.5 |
| 5,963,222 | 10/1999 | Cheney et al. | 345/516 |

*Primary Examiner*—Madeleine Nguyen
*Attorney, Agent, or Firm*—The Hecker Law Group

[57] ABSTRACT

A method and apparatus for generating addresses. The present invention provides for fast generation of a series of addresses in an array where the series comprises a column or diagonal of the array, such as for layered ECC code words in CD-ROM. Whereas each address is computable individually using multipliers and modulo circuits, the present invention operates on the series of addresses as a whole, forming a dependence between successive addresses. The dependence is separated into multiple address indices that may be summed together for the desired address. The present invention is thus able to generate a series of addresses by accumulation processes requiring only selection of the appropriate increment value and addition to a previously stored address index value. Address generation throughput is increased with savings in layout area and power.

40 Claims, 11 Drawing Sheets

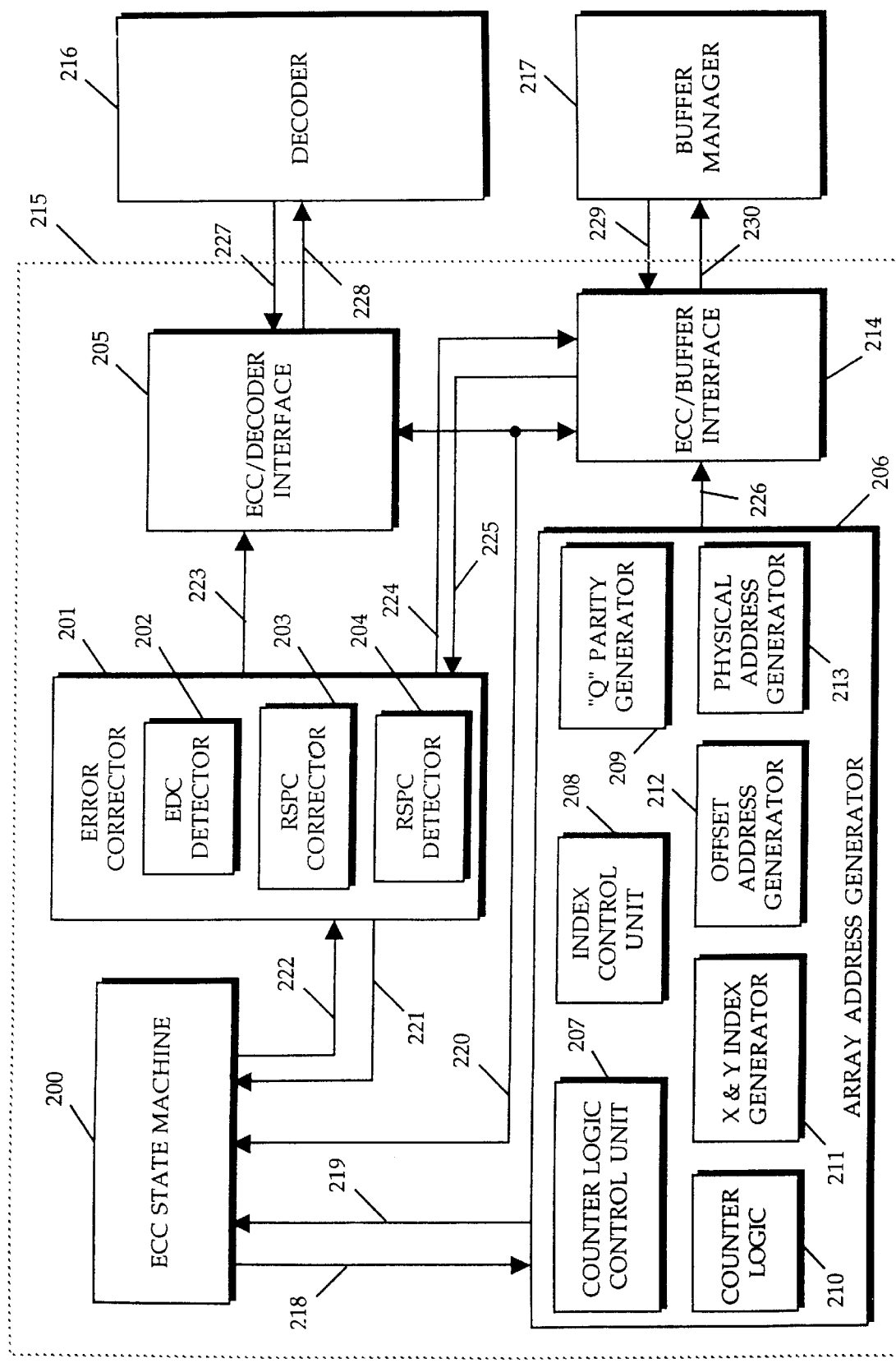

| | 0 | 1 | 2 | 3 | 4 | . | . | . | 25 | . | . | . | 41 | 42 |
|---|---|---|---|---|---|---|---|---|---|---|---|---|---|---|
| 0 | 0000 | 0002 | 0004 | 0006 | 0008 | . | . | . | 0050 | . | . | . | 0082 | 0084 |
| 1 | 0086 | 0088 | 0090 | 0092 | 0094 | . | . | . | 0136 | . | . | . | 0168 | 0170 |
| 2 | 0172 | 0174 | 0176 | 0178 | 0180 | . | . | . | 0222 | . | . | . | 0254 | 0256 |
| 3 | 0258 | 0260 | 0262 | 0264 | 0266 | . | . | . | 0308 | . | . | . | 0340 | 0342 |
| 4 | 0344 | 0346 | 0348 | 0350 | 0352 | . | . | . | 0394 | . | . | . | 0426 | 0428 |
| . | . | . | . | . | . | | | | . | | | | . | . |
| . | . | . | . | . | . | | | | . | | | | . | . |
| . | . | . | . | . | . | | | | . | | | | . | . |
| 23 | 1978 | 1980 | 1982 | 1984 | 1986 | . | . | . | 2028 | . | . | . | 2060 | 2062 |
| 24 | 2064 | 2066 | 2068 | 2070 | 2072 | . | . | . | 2114 | . | . | . | 2146 | 2148 |
| 25 | 2150 | 2152 | 2154 | 2156 | 2158 | . | . | . | 2200 | . | . | . | 2232 | 2234 |
| 26 | 2236 | 2238 | 2240 | 2242 | 2244 | . | . | . | 2286 | | | | | |
| 27 | 2288 | 2290 | 2292 | 2294 | 2296 | . | . | . | 2338 | | | | | |

P CODE WORD

Q CODE WORD

FIGURE 3A

|    | 0    | 1    | 2    | 3    | 4    | ... | 25   | ... | 41   | 42   |
|----|------|------|------|------|------|-----|------|-----|------|------|
| 0  | 0001 | 0003 | 0005 | 0007 | 0009 | ... | 0051 | ... | 0083 | 0085 |
| 1  | 0087 | 0089 | 0091 | 0093 | 0095 | ... | 0137 | ... | 0169 | 0171 |
| 2  | 0173 | 0175 | 0177 | 0179 | 0181 | ... | 0223 | ... | 0255 | 0257 |
| 3  | 0259 | 0261 | 0263 | 0265 | 0267 | ... | 0309 | ... | 0341 | 0343 |
| 4  | 0345 | 0347 | 0349 | 0351 | 0353 | ... | 0395 | ... | 0427 | 0429 |
| .  |      |      |      |      |      |     |      |     |      |      |
| .  |      |      |      |      |      |     |      |     |      |      |
| 23 | 1979 | 1981 | 1983 | 1985 | 1987 | ... | 2029 | ... | 2061 | 2063 |
| 24 | 2065 | 2067 | 2069 | 2071 | 2073 | ... | 2115 | ... | 2147 | 2149 |
| 25 | 2151 | 2153 | 2155 | 2157 | 2159 | ... | 2201 | ... | 2233 | 2235 |
| 26 | 2237 | 2239 | 2241 | 2243 | 2245 | ... | 2287 | ... |      |      |
| 27 | 2289 | 2291 | 2293 | 2295 | 2297 | ... | 2339 | ... |      |      |

P CODE WORD →
Q CODE WORD ↗

| | 0 | 1 | 2 | 3 | 4 | . . . . . | 24 | 25 | 26 | . . . . . | 41 | 42 | 43 | 44 |
|---|---|---|---|---|---|---|---|---|---|---|---|---|---|---|
| 0 | 0000 | 0088 | 0176 | 0264 | 0352 | . . . . . | 2112 | 2200 | (0052) | . . . . . | 1372 | 1460 | 2236 | 2288 |
| 1 | 0086 | 0174 | 0262 | 0350 | 0438 | . . . . . | 2198 | (0050) | 0138 | . . . . . | 1458 | 1546 | 2238 | 2290 |
| 2 | 0172 | 0260 | 0348 | 0436 | 0524 | . . . . . | (0048) | 0136 | 0224 | . . . . . | 1544 | 1632 | 2240 | 2292 |
| 3 | 0258 | 0346 | 0434 | 0522 | 0610 | . . . . . | 0134 | 0222 | 0310 | . . . . . | 1630 | 1718 | 2242 | 2294 |
| 4 | 0344 | 0432 | 0520 | 0608 | 0696 | . . . . . | 0220 | 0308 | 0396 | . . . . . | 1716 | 1804 | 2244 | 2296 |
| . | | | | | | | | | | | | | | |
| . | | | | | | | | | | | | | | |
| 23 | 1978 | 2066 | 2154 | (0006) | 0094 | . . . . . | 1854 | 1942 | 2030 | . . . . . | 1114 | 1202 | 2282 | 2334 |
| 24 | 2064 | 2152 | (0004) | 0092 | 0180 | . . . . . | 1940 | 2028 | 2116 | . . . . . | 1200 | 1288 | 2284 | 2336 |
| 25 | 2150 | (0002) | 0090 | 0178 | 0266 | . . . . . | 2026 | 2114 | 2202 | . . . . . | 1286 | 1374 | 2286 | 2338 |

FIGURE 3C

METHOD AND APPARATUS FOR GENERATING ADDRESSES

This is a continuation of application Ser. No. 08/620,266 filed Mar. 22, 1996.

BACKGROUND OF THE INVENTION

1. Field of the Invention

This invention relates to the field of data addressing, and, in particular, to address generation for error correction in compact disc read-only memory (CAROM).

2. Background

Compact disc read-only memory (CD-ROM) is widely used for the storage and disbursement of large amounts of digital information. A single 12 cm CD-ROM disc can store more than 527 megabytes (MB) of data, the equivalent of 200,000 printed pages or more than 375 1.4 MB floppy diskettes. Also, the durable construction of the disc and the nonvolatile nature of the data make CD-ROM ideal for safe data transport.

The CD-ROM disc consists of a clear plastic, called polycarbonate, coated on one surface with a reflective metallic layer and a protective lacquer label. Digital information is stored on the disc in the form of small surface impressions, called "pits," molded into the plastic and the flat gaps between pits, called "lands." The reflective metallic layer is applied over the molded surface of the plastic.

The pits and lands, representing binary data, are laid out in a spiral track roughly 0.6 microns wide at a track density of approximately 16,000 tracks per inch. The spiral track is read outward from the center of the disc with constant linear velocity (CLV). This CLV scheme permits the bit density near the outer edge of the disk to match that near the axis by manipulation of the CD-ROM drive speed. The data is read from the surface of the disc by focusing a laser beam from a laser diode through the clear polycarbonate onto the track. A pit serves to scatter and absorb the laser beam, whereas a land reflects the laser beam into a photodetector. Typically, a CD-ROM drive processes the analog signal from the photodetector to obtain digital data, performs error correction, and provides the digital data to a host computer.

FIG. 1 shows a simplified block diagram of a CD-ROM drive coupled to a host computer. CD-ROM disc 100 rests on a spinning turn table represented by turn table motor 101. The turn table motor receives control signals 113 from turn table motor control block 103 to control the speed and acceleration of the rotating CD-ROM disc. An optical pickup on a movable arm is positioned adjacent the surface of the disc by optical pickup and arm block 102, which receives control signals 114 from focus and radial tracking control block 104. Photodetector signal 112 generated from optical pickup and arm block 102 is provided to focus and radial tracking control block 104 and signal processor 105.

Drive control CPU (central processing unit) 106 monitors the data flow through signal processor 105 via signals 117, and provides servo control signals 116 to turn table motor control block 103 and focus and radial tracking control block 104. Drive control CPU 106 interfaces with control CPU 109 via signal lines 118 to receive track and index requests for directing the servo system of the CD-ROM drive.

Signal processor 105 demodulates the analog photodetector signal into a stream of binary bits, decodes the EFM data stream and performs descrambling arid CIRC correction. Signal processor 105 provides decoded and descrambled digital data 119 to audio circuit 107 and ECC/EDC (error correction coding/error detection coding) processor 108. If the data on the compact disk is audio data, such as for a music CD, an optional audio circuit 107 may transform digital data 119 into analog audio output signal 120.

ECC/EDC processor 108 places digital data 119 from signal processor 105 into buffer memory 122 (RAM, typically 16 kB) and performs error correction before transmitting the corrected data over bus 125 to the host computer interface (I/F) card 111 in host computer 110. Sector address information extracted from the header in the data sector is provided to control CPU 109 over bus 125. Control signals 121 are exchanged between ECC/EDC processor 108 and control CPU 109 to control data transfers from ECC/EDC processor 108 across bus 125.

ECC/EDC processor 108 and I/F card 111 exchange request and acknowledge signals (123) when a processed sector is ready to be transferred from buffer 122 to I/F card 111. I/F card 111 and control CPU 109 also may communicate across bus 125, using control signals 124 to coordinate bus use. A software "driver" process, designed for the specific CD-ROM drive and resident in the host computer, provides the appropriate protocol for the host computer's CPU and I/F card to communicate with control CPU 109 and ECC/EDC processor 108.

The CD-ROM drive servo system, primarily comprising blocks 101–104 and 106, positions the optical pickup (i.e., laser diode and photodetector) above the appropriate track of the compact disc. The servo system is used for locating a specific sector of the compact disc and controlling motor spin, as well as for maintaining tracking and beam focus. Servo system implementations are further described in *The Brady Guide to CD-ROM*, by Laura Buddine and Elizabeth Young, published by Prentice Hall Press, New York, in 1987. The servo system descriptions of *The Brady Guide to CD-ROM* are incorporated herein by reference.

Signal 112 produced by the photodetector in response to the reflected laser beam is an analog signal modulated in proportion to the length of the pits and lands. In signal processor 105, analog signal 112 is converted into a binary digital signal, with a transition between lands and pits interpreted as a "1", and the intervals in between interpreted as "0's." Typically, Eight to Fourteen Modulation (EFM) is used to encode the information stored on the CD-ROM disc. Accordingly, when the data is read back from the disc, the fourteen-bit data is decoded into eight-bit format with an EFM lookup table in signal processor 105. Typically, subsequent to decoding, CIRC (cross-interleaved Reed-Solomon code) error correction is performed in block 105 to generate audio quality data 119 with a bit error rate on the order of $10^{-9}$ bits/second for scratched or dirty discs.

Compact discs are subject to errors from scratches, dust particles, fingerprints, and other sources of reading interference. These types of interference can result in long burst errors in the reading of the underlying disc tracks. Cross-coding and interleaving of data serves to break up long burst errors into very small errors or error bursts when the data is descrambled. Reed-Solomon codes are applied to the small error bursts to perform limited correction. The resulting corrected data out of the signal processor is of audio quality.

While blanking and interpolating of audio data can reduce errors so as to be substantially undetectable by the human ear, these processes are not satisfactory for CD-ROM data storage purposes which typically require a bit error rate of better than $10^{-12}$ bits/second. For this reason, further error correction, sometimes referred to as layered ECC, is performed in ECC/EDC processor 108.

ECC/EDC processor 108 stores several sectors of decoded data 119 in buffer 122 at any moment in time. ECC/EDC hardware performs error correction on the buffered data one sector at a time, transferring the corrected sectors to host computer 110 as they are completed. The software driver resident in the host computer interfaces with the operating system or other CD-ROM utility software to handle the transfer of incoming data through I/F card 111 into the host computer's RAM.

The decoded sector data 119 contains 2352 bytes of information arranged as follows:

| Relative Byte Address | Contents |
| --- | --- |
| — | 12 Data Sync Bytes |
| 0–3 | 4 Header Bytes |
| 4–2051 | 2048 Data Bytes |
| 2052–2339 | 288 ECC/EDC Bytes |

The first twelve bytes of the sector are used as data sync bytes. The first and last bytes of the sync field are $00_{hex}$, whereas the rest of the sync field bytes are $FF_{hex}$. The header field contains the sector address and the mode byte. The first three bytes of the header are the minutes, seconds and sector, respectively, stored in binary coded decimal format. The mode byte indicates the nature of the data stored in the data field. For instance, zero mode indicates that the data field contains all 0's. Modes one and two indicate CD-ROM data with ECC/EDC (2,048 bytes of user data) and without ECC/EDC (2,336 bytes of user data), respectively.

The 288 ECC/EDC bytes contain four cyclical redundancy check (CRC) bytes followed by eight bytes of zeros. The CRC is a simple checksum calculated from the sync, header and data blocks by calculating a value of a polynomial on the three blocks. This constitutes the error detection coding (EDC) for the sector, and is ultimately compared with the value of the polynomial that is calculated after the error correction coding (ECC) has been applied. If the CRC bytes match the value calculated from the corrected data, it is assumed that all errors have been corrected. The CRC bytes provide only error detection, not correction.

The 276 bytes of ECC check bytes are used for Reed-Solomon coding. Reed-Solomon encoding/decoding algorithms involve polynomials calculated with a finite field arithmetic known as Galois Fields (GF). This process constructs one polynomial whose roots locate erroneous bytes, and another polynomial that gives the correction value to be added to the erroneous bytes. For CD-ROM, ECC is performed using forty-three independent (26,24) Reed-Solomon code words and twenty-six independent (45,43) Reed-Solomon code words over $GF(2^8)$.

The 2,064 bytes containing the header, user data, CRC and zero bytes are combined into 1,032 two-byte words having a "most significant byte" (MSB) and "least significant byte" (LSB). The MSB's and LSB's of the words are operated on as if they exist in two separate 43×24 arrays, designated as the LSB plane and the MSB plane. Column correction, called "P" correction, and diagonal correction, called "Q" correction, are each performed on both arrays. This dual correction scheme permits multiple uncorrectable errors in a single column to be corrected by the overlapping diagonal correction process, and vice versa.

FIG. 7 is a flow diagram of the general ECC correction process, which can be represented as nested loops. Beginning in block 700, the ECC/EDC processor is set for "P" correction. In the following block 701, the ECC/EDC processor is set to operate on the LSB plane of the chosen sector data. In block 702, the data is read from the buffer in the form of code words, and RSPC (Reed-Solomon Product Code) detection is performed to identify errors.

A branching occurs at decision block 703 based on whether errors were detected in the preceding detection phase. If no errors were detected, then the process continues in block 706. However, if errors were detected, then, in block 704, RSPC correction is performed on the erroneous code words, and, in subsequent block 705, the corrected bytes are written back to the buffer. After block 705, the process continues in block 706.

In block 706, a branching occurs based on the sector plane just completed. If the LSB plane was just completed, then, in block 707, the ECC/EDC processor is set for the MSB plane and the process returns to block 702. If the MSB plane was just completed, then, in decision block 708, another branching occurs based on which type of ECC correction was just performed.

If "P" correction was just performed, then, in block 709, the ECC/EDC processor is set for "Q" correction and the process returns to block 701. However, if "Q" correction was just completed, then, in block 710, a branching occurs based on whether any uncorrectable errors were reported during "P" or "Q" correction. If no uncorrectable errors were detected, then, in block 711, EDC detection is performed on the sector data using CRC check bytes. Subsequently, in block 712, the entire sector is written to the host computer. If, in block 710, uncorrectable errors were reported, then, in block 713, the correction process is repeated from block 700, or the ECC/EDC processor reports an uncorrectable error in the sector.

FIGS. 3A and 3B illustrate the LSB and MSB arrays respectively, showing the row and column positions of the relative addresses for the sector information. That portion of the array comprising the header, user data, CRC and zero bytes is indicated by the numeral 300. Numerals 301 and 302 indicate ECC data.

Address "0000" in FIG. 3A corresponds to the first byte of sector information, but does not typically correspond to physical address location "0000" in the buffer. The buffer may contain several sectors of information at any moment in time, accessing the appropriate sector information by specifying the physical address of the beginning of the sector, and adding a value comprising the relative address of the appropriate array location. Various schemes for mapping sectors into buffer memory are available, including modulo address generation.

Each column of the arrays in FIGS. 3A and 3B has two precalculated check bytes appended, and represents a single Reed-Solomon code word. There are 43 column code words, designated as "P" code words, in each array. By appending two bytes of ECC data (301) to each column, a new twenty-six row array is created (region 300 plus region 301) wherein the respective 43×24 array (300) is a subset. A second, independent set of code words is created by using the diagonals of the 43×26 array, starting with the first column and wrapping where necessary to obtain twenty-six new code words for each plane. These new code words are referred to as "Q" code words. Each "Q" code word also has two appended check bytes (302).

FIG. 3C illustrates a remapping of the LSB plane to define "Q" code words along the rows of the array. A remapping of the MSB plane could be similarly performed. The remapped 43×26 array is labelled with numeral 303, and includes all elements from regions 300 and 301 of FIG. 3A. Region 302 contains the "Q" code word ECC bytes. Addresses are circled in the diagram where a modulo operation of the array address space forces the "Q" code word address sequence to wrap through zero.

The "P" code words can be viewed as a twenty-six element column vector, wherein the first twenty-four elements are a column from region 300, and the last two elements are two bytes of ECC from the corresponding column in region 301. Each element consists of the memory contents at the indicated relative memory address in the array. In some texts, these elements of the code words are referred to as "symbols." A "P" code word may be represented generally as:

$$P(n) = \begin{bmatrix} (2)n + (86)(0) + A \\ (2)n + (86)(1) + A \\ (2)n + (86)(2) + A \\ (2)n + (86)(3) + A \\ \vdots \\ (2)n + (86)(25) + A \end{bmatrix} \quad [1]$$

where n is the column number from 0–42, A(MSB)=1, and A(LSB)=0.

Similarly, the "Q" code words can be viewed as a forty-five element column vector, wherein the first forty-three elements are a row of region 303 (or a diagonal of regions 300 and 301), and the last two elements are two bytes of ECC from the corresponding rows in region 302 of FIG. 3C. Thus, a "Q" code word may be represented generally as:

$$Q(m) = \begin{bmatrix} [(88)(0) + (86)m] \text{ MOD } 2236 + A \\ [(88)(1) + (86)m] \text{ MOD } 2236 + A \\ [(88)(2) + (86)m] \text{ MOD } 2236 + A \\ \vdots \\ [(88)(42) + (86)m] \text{ MOD } 2236 + A \\ (86)(26) + (2)m + A \\ (88)(26) + (2)m + A \end{bmatrix} \quad [2]$$

where m is the row number from 0–25, A(MSB)=1, and A(LSB)=0.

Because the "P" and "Q" code words are constructed from interleaved bytes rather than consecutive bytes, special means are required to calculate the correct addresses when the code words are read from the buffer for ECC correction. The calculation of relative array addresses for the "P" and "Q" code word elements, as shown in the P(n) and Q(m) vector representations, requires two multiplication operations and at least one addition operation per address. In addition, the "Q" code words require a modulo operation. The amount of chip area and power required, as well as the time delay involved, for these calculations impinge on the cost and performance of the ECC/EDC circuit and thus the CD-ROM drive.

SUMMARY OF THE INVENTION

The present invention is a method and apparatus for generating addresses. The present invention provides for fast generation of a series of addresses in an array where the series comprises a column or diagonal of the array, such as for layered ECC code words in CD-ROM. Whereas each address is computable individually using multipliers and modulo circuits, the present invention operates on the series of addresses as a whole, forming a dependence between successive addresses. The dependence is separated into multiple address indices that may be summed together for the desired address. The present invention is thus able to generate a series of addresses by accumulation processes requiring only selection of the appropriate increment value and addition to a previously stored address index value. Address generation throughput is increased with savings in layout area and power.

In the present invention, address generation is divided into generation of an index for each dimension of the array. The direction of the code word or address series is indicated by a Y index, whereas the perpendicular direction is indicated with an X index. The X index is used for incrementing between consecutive columns or diagonals of the array for multiple code words, sweeping processes, etc. The size of the array (e.g., (M+1)×(N+1)) is used to calculate the appropriate increment factor for address generation along each index direction. When a diagonal series wraps through the base address of the array, a "roll-over" point is sensed, and an appropriate address value is injected into the Y index. The Y index is incremented every address, whereas the X index is incremented for each consecutive code word.

In one embodiment of the present invention, each index is produced by an index generator circuit, and the generated indices are summed at the output. In each index generator, a first multiplexer selects the appropriate increment value, and a second multiplexer selects the appropriate initial value for each index as well as providing a feedback path from a storage register. The outputs of the first and second multiplexers are summed together in an adder and stored in the storage register. A newly incremented value is loaded into the Y index storage register when a new address is desired, and a newly incremented value is loaded into the X index storage register when a new code word is desired. A counter is maintained for each index to monitor progression through the array, and an additional counter is maintained for indicating a "roll-over" point for modulo function. A control unit responds to the counter values and state information from an ECC state machine to provide selection signals to the multiplexers.

The present invention utilizes multiplexers, counters, adders and combinational logic to accomplish what otherwise would require large, slow multiplier circuits and complex modulo circuitry. Further, the speed enhancement provided by the present invention can be used to optimize buffer memory access by reading an entire code word from buffer memory in a single hand-shaking session, reducing timing overhead. The present invention therefore provides several advantages over other address generation schemes.

BRIEF DESCRIPTION OF THE DRAWINGS

FIG. 2 is a block diagram of an ECC/EDC circuit incorporating the address generating means of the present invention.

FIG. 3A is an address array diagram of the LSB plane of a sector in the buffer memory of a CD-ROM drive.

FIG. 3B is an address array diagram of the MSB plane of a sector in the buffer memory of a CD-ROM drive.

FIG. 3C is a remapped address array diagram of the "Q" code words in the LSB plane of a sector in the buffer memory of a CD-ROM drive.

DETAILED DESCRIPTION OF THE INVENTION

Figure 1:
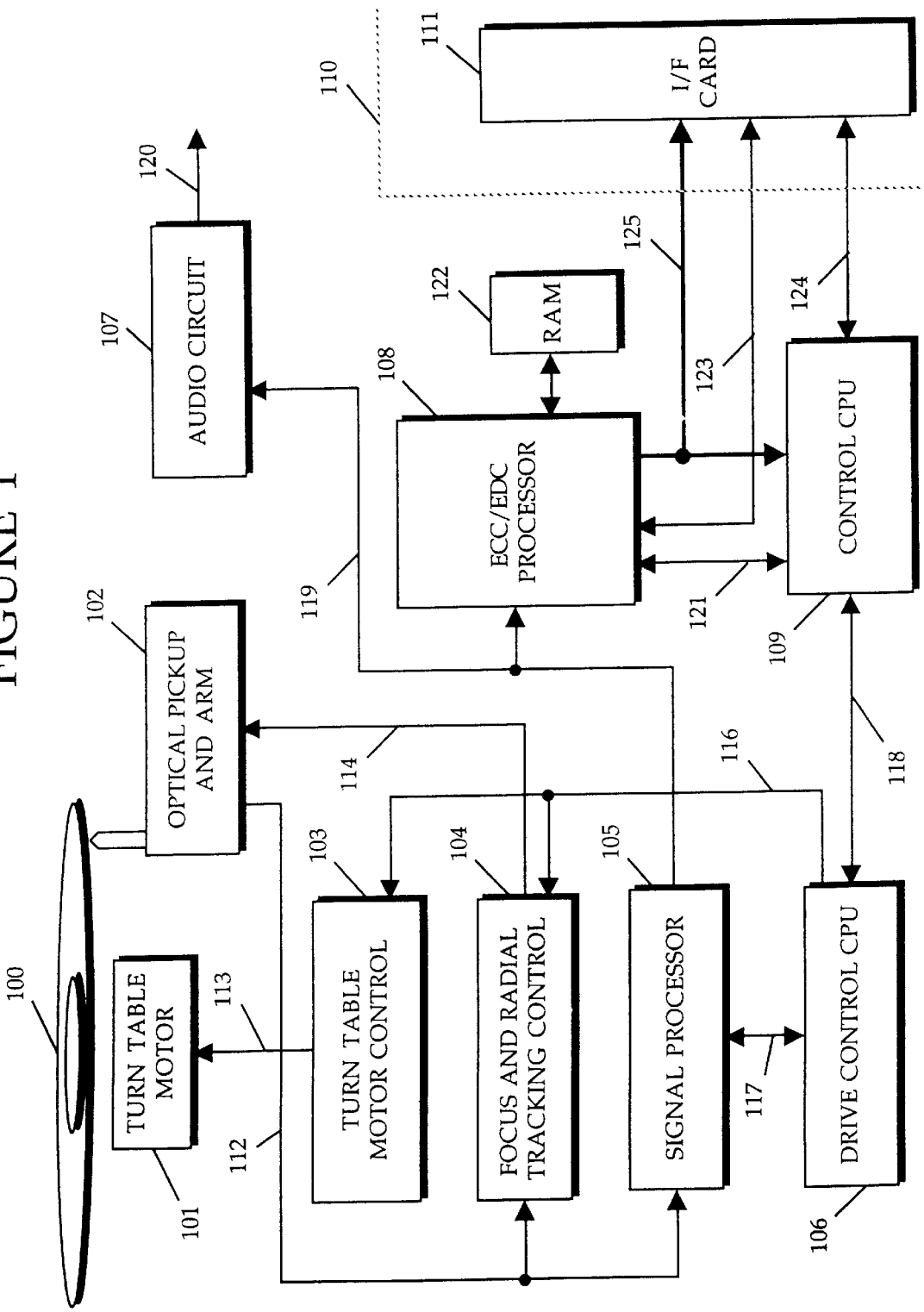
FIG. 1 is a block diagram of a CD-ROM drive.

The present invention is a method and apparatus for generating addresses. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

In a multidimensional array consisting of a wrapped, unidimensional stream of elements, such as for interleaved coding in a CD-ROM data stream or image processing of computer graphics files, the accessing of linear sequences containing nonconsecutive elements of the stream requires the use of complex mathematical circuits, such as multipliers and modulo circuits, to generate element addresses within the stream. These complex circuits require extensive overhead in chip area, power and speed.

The method of the present invention defines a dependence between elements of the desired linear sequence such that the required mathematical operations are reduced to several summing operations based on a previously calculated address index and an incrementing value determined by the interleaving interval or angle of the linear sequence with respect to the axes of the array. An embodiment of the apparatus for implementing this method comprises registers for the stored indices, adders for incrementing of the indices, and multiplexers for selection of the appropriate incrementing value. Modulo operations are performed by resetting of the appropriate index at intervals, and may be implemented with counters.

The present invention has particular utility in CD-ROM ECC operations, description of which is provided as an example. However, the present invention is not limited to CD-ROM technology, but has application to any interleaved or arrayed process, particularly those using linear sweep-style operations, and including arrangements in three or more dimensions to which the following CD-ROM example can be extended.

The present invention uses an X index to manage address increments that are tangential to the axis defined by the desired linear sequence, e.g. for sweeping operations. For a linear sequence comprising a "P" code word, the X index manages address increments between consecutive columns (i.e., the horizontal axis) as shown in FIG. 3A. For "Q" code words, the X index manages address increments between consecutive rows (i.e., the vertical axis) as shown in FIG. 3C.

A Y index manages address increments along the axis defined by the desired linear sequence. For a linear sequence comprising a "P" code word, the Y index manages address increments between consecutive rows (i.e., the vertical axis) as shown in FIG. 3A. For "Q" code words, the Y index manages address increments between consecutive columns (i.e., the horizontal axis) as shown in FIG. 3C.

Using the X and Y indices to determine the stream address of elements in the sequence requires only a summing of the two index values. If the stream is a segment of a larger stream, e.g. a 2340 byte stream in a 16 kilobyte memory, the starting address of the segment is summed with the indices. Finally, if the stream is divided into a plurality of planes, as in the case of layered ECC/EDC in CD-ROM, an offset for the appropriate plane is used as the initial value of one of the indices.

To identify how the code word addresses are broken down into X and Y indices, the CD-ROM code word vectors of equations [1] and [2] are generalized to a generic array of (M+1) rows and (N+1) columns. The generic "P" column vector is as follows:

$$P(n) = \begin{bmatrix} pn + p(N+1)(0) + A \\ pn + p(N+1)(1) + A \\ \vdots \\ pn + p(N+1)m + A \\ \vdots \\ pn + p(N+1)M + A \end{bmatrix}$$

where "p" is the number of element planes (e.g. CD-ROM has two, MSB and LSB), "m" is the row number of the element, "n" is the column number of the element and "A" is the plane offset from the range [0. . . (p−1)].

The "P" code word can be represented generally as $$P(n) = \begin{bmatrix} X_n + Y_0 \\ X_n + Y_1 \\ \vdots \\ X_n + Y_{m-1} \\ X_n + Y_m \\ \vdots \\ X_n + Y_M \end{bmatrix} \quad [3]$$

where, for $n = [0 \ldots N]$ $X_{INI} = X_0 = p(0) = 0$ (Initial value = 0) [4]

$$\begin{aligned} X_n &= pn & [5] \\ &= [p(n-1)] + p \\ &= X_{n-1} + p \\ &= X_{n-1} + X_{INC} & \text{(Increment value } = p) \end{aligned}$$

$Y_{INI} = Y_0 = [p(N+1)(0)] + A = A$ (Initial value = $A$) [6]

$$\begin{aligned} Y_m &= [p(N+1)m] + A & [7] \\ &= [p(N+1)(m-1)] + A + [p(N+1)] \\ &= Y_{m-1} + [p(N+1)] \\ &= Y_{m-1} + Y_{INC} & \text{(Increment value } = [p(N+1)]) \end{aligned}$$

The "A" term that represents the offset for the multiple byte planes in equation [1] is included for simplicity in the Y index initial value equation [6]. For the CD-ROM ECC example: p=2; A=0,1; M=25; N=42. Putting these values into equations [4]–[7], the "P" code word address generation values for the X and Y indices are:

X index: $X_{INI}$=0; $X_{INC}$=2 [8]

Y index: $Y_{INI,LSB}$=0; $Y_{INI,MSB}$=1; $Y_{INC}$=86 [9]

The generic "Q" diagonal vector is provided below. The term "S" in the following vector represents the slope (integer valued) of the "Q" vector. For instance, in FIG. 3A, the "Q" code word shown for CD-ROM has a slope "S" of one, i.e., a drop of one row position per column advance (prior to remapping as in FIG. 3C). In the general scheme, "S" can lie anywhere in the range [0 . . . M], with zero slope implying a code word made up of addresses spaced only by the value "p." The general "Q" vector is:

$$Q(m) = \begin{bmatrix} \{[S(N+1)+1]p(0) + p(N+1)m\} \text{MOD } [p(M+1)(N+1)] + A \\ \vdots \\ \{[S(N+1)+1]pn + p(N+1)m\} \text{MOD } [p(M+1)(N+1)] + A \\ \vdots \\ \{[S(N+1)+1]pN + p(N+1)m\} \text{MOD } [p(M+1)(N+1)] + A \\ \hline \text{[TWO "}Q\text{" ECC BYTES]} \end{bmatrix}$$

$$= \begin{bmatrix} X_m + Y_0 \\ \vdots \\ X_m + Y_{n-1} \\ X_m + Y_n \\ \vdots \\ X_m + Y_N \\ \hline \text{"}Q\text{" ECC} \end{bmatrix} \quad \text{where, } m = [0 \ldots M]$$

[10]

Before the "Q" vector is separated into X and Y indices, the modulo (MOD) function is solved by specifying the modulo "roll-over" points in the "Q" array. These roll-over discontinuities are then taken into account in the X and Y index generation process. For M<N, roll-over occurs at:

$$m + Sn = k(M+1) \quad \text{or} \quad n = [k(M+1) - m]/S \quad [11]$$

where "k" is an integer. The modulo function can therefore be solved at the roll-over point by subtracting "k" times the modulo value from the larger term as follows:

$$\begin{aligned} Q(m,n) &= [S(N+1)+1]pn + p(N+1)[k(M+1) - Sn] - \\ &\quad kp(M+1)(N+1) \\ &= pn \end{aligned} \quad [12]$$

By substituting the results of equation [12] into the "Q" vector equation at the roll-over points, the "Q" vector can be rewritten as:

$$Q(m) = \begin{bmatrix} p(N+1)m + [S(N+1)+1]p(0) + A \\ \vdots \\ p(N+1)m + [S(N+1)+1]pn + A \\ A + [S(N+1)+1]p(0) + pn' \\ A + [S(N+1)+1]p(1) + pn' \\ \vdots \\ A + [S(N+1)+1]p(n-n') + pn' \\ \vdots \\ A + [S(N+1)+1]p(N-n') + pn' \\ \hline \text{[TWO "}Q\text{" ECC BYTES]} \end{bmatrix} \quad [13]$$

where $n' = [k(M+1) - m]/S$.

The X and Y indices are then solved as follows:

$X_{INI} = X_0 = p(N+1)(0) = 0$ (Initial value = 0) [14]

-continued $$X_{m,n} = p(N+1)m \quad \text{(for } n < n') \quad [15]$$
$$= p(N+1)(m-1) + p(N+1)$$
$$= X_{m-1} + p(N+1)$$
$$= X_{m-1} + X_{INC} \quad \text{(Increment value} = p(N+1))$$

$$X_{m,n} = A \quad \text{(Stable value for } n \geq n') \quad [16]$$

$$Y_{INI} = Y_0 = [S(N+1)+1]p(0) + A = A \quad \text{(Initial value} = A) \quad [17]$$

$$Y_n = [S(N+1)+1]pn + A \quad \text{(for } n < n') \quad [18]$$
$$= [S(N+1)+1]p(n-1) + A + [S(N+1)+1]p$$
$$= Y_{n-1} + [S(N+1)+1]p$$
$$= Y_{n-1} + Y_{INC} \quad \text{(Increment value} = p[S(N+1)+1])$$

$$Y_{n'} = pn' \quad \text{(for } n = n') \quad [19]$$

$$Y_n = [S(N+1)+1]p(n-n') + pn' \quad \text{(for } n > n') \quad [20]$$
$$= [S(N+1)+1]p(n-1-n') + pn' + [S(N+1)+1]p$$
$$= Y_{n-1} + [S(N+1)+1]p$$
$$= Y_{n-1} + Y_{INC} \text{ (Same increment value} = p[S(N+1)+1])$$

The term "A" is managed by the X index at the rollover point for reasons of convenience with respect to physical implementation. For the "Q" code words in CD-ROM ECC, the slope "S" is one. The address generation values for the X and Y indices obtained from equations [14]–[20] are:

$$X \text{ index: (for } n < n') \quad [21]$$
$$X_{INI} = 0; X_{INC} = 86 \quad \text{(Index from } n = n' - 1 \text{ is stored)}$$
$$\text{(for } n \geq n')$$
$$X \text{ index} = 0 \, (LSB), 1(MSB)$$

$$Y \text{ index: } Y_{INI,LBS} = 0; Y_{INI,MBS} = 1; Y_{INC} = 88 \quad [22]$$
$$\text{(at } n = n')$$
$$Y \text{ index} = 2n$$

The values derived in equations [8], [9], [21] and [22] are used inside of an array address generator to provide the appropriate addresses for ECC code words in the ECC/EDC circuit. Control circuitry selects which values are used during each part of the ECC process. A separate "Q" parity generator circuit is used to provide the two "Q" ECC byte addresses for each code word.

FIG. 2 is a block diagram of an ECC/EDC circuit 215 for use in the ECC/EDC processor 108 of FIG. 1. In FIG. 2, ECC/EDC circuit 215 comprises ECC state machine 200, error corrector 201, ECC/decoder interface 205, array address generator 206 and ECC/buffer interface 214. Error corrector 201 further comprises EDC detector 202, RSPC (Reed-Solomon Product Code) corrector 203 and RSPC detector 204. Array address generator 206 further comprises counter logic control unit 207, index control unit 208, "Q" parity generator 209, counter logic 210, X and Y index generator 211, offset address generator 212 and physical address generator 213.

Decoder 216 sends and receives signals 227 and 228, respectively, to ECC/decoder interface 205. ECC state machine 200, ECC/decoder interface 205 and ECC/buffer interface 214 are coupled via bus 220. Error corrector 201 is coupled to ECC/decoder interface 205 via bus 223. Error corrector 201 sends data to and receives data from ECC/buffer interface 214 via buses 224 and 225, respectively.

Error corrector 201 is coupled to ECC state machine 200 via buses 221 and 222, and to array address generator 206 via buses 218 and 219. Array address generator 206 is coupled to ECC/buffer interface 214 via bus 226. ECC/buffer interface 214 is coupled to buffer manager 217 via buses 229 and 230 to read from and write to buffer 122 (not shown).

In FIG. 2, decoder 216 is the interface to signal processor 105. Decoder 216 latches in the serial data, performs descrambling, performs serial to parallel conversion to generate bytes, and writes the bytes to memory. ECC/decoder interface 205 latches in CD-ROM format information, such as the CD-ROM's mode and form, repeat correction times, etc.

ECC state machine 200 monitors the ECC process and sends control signals to error corrector 201 and array address generator 206 to coordinate the correction and address generation functions for the different states, such as MSB "P" correction, LSB "P" correction, MSB "Q" correction, and LSB "Q"correction. Error corrector 201 responds to control signals from state machine 200, and sends status information back to state machine 200 regarding correction progress, e.g., notification of completion of "P" correction or notification that an uncorrectable error was detected. Error corrector 201 reads the code words from bus 225 and returns corrected data via bus 224.

RSPC detector 204 operates on the "P" and "Q" code words to determine which code words contain correctable errors. Uncorrectable errors are also flagged for possible iterative correction. If RSPC detector 204 finds errors in the ECC code words, then RSPC corrector 203 operates on the erroneous code words to correct the applicable bytes. The RSPC corrector then transmits the corrected bytes back to the buffer via ECC/buffer interface 214. After the ECC correction is completed, EDC detector 202 operates on the entire sector using the CRC check bytes to determine if the ECC process was successful.

ECC/buffer interface 214 receives address signal 226 from array address generator 206 and requests, for the specified address, either a read or a write operation from buffer manager 217, based on signals received from ECC state machine 200. Using a handshaking process, data is either received from the buffer manager and transmitted to the error corrector, or data is received from the error corrector and transmitted to the buffer manager.

Because the array address generator of the present invention can construct successive code word element addresses in consecutive clock periods, it is possible for the ECC/buffer interface to request a read operation of the buffer manager and maintain the active request signal until an entire code word is transferred to the error corrector. In other words, rather than performing a complete handshaking operation for each byte, the present invention provides the ability for the ECC/EDC circuit to transfer an entire code word in one handshaking operation, reducing timing overhead.

Signal processor 105 also accesses the buffer for reading in digital data 119. However, the data rate for signal 119 is significantly slower than the ECC process. If the data from signal processor 105 is interrupted, re-accessing the data on the disc will significantly reduce transmission efficiency. Therefore, to maintain uninterrupted data flow from signal processor 105, signal 119 receives highest priority for buffer transfers.

Array address generator 206 is responsible for providing the physical RAM addresses for the elements of the different code words. State machine 200 transmits control signals to control units within array address generator 206 to trigger the appropriate address generation process. Within array address generator 206, address generation is performed by four generator blocks, including X and Y index generator 211.

X and Y index generator 211 provides the relative array address for each code word element. Offset address generator 212 performs shifting of the relative address based on the memory layout. Different memory layouts map different locations for the header, subheader, data and ECC/EDC bytes. Physical address generator 213 takes the addresses from the other three generators and sums them together to generate the physical address transmitted as signal 226.

The X and Y index generator is supported by counter logic 210 and index control unit 208. Counter logic 210 provides row and column markers for calculation of the indices. Index control unit 208 selects appropriate values for the X and Y index generator based on the contents of the counter logic, as well as control signals from state machine 200. Counter logic control unit 207 manages the counters in counter logic 210 based on control signals from state machine 200.

"Q" parity generator 209 generates the "Q" ECC byte addresses when needed for "Q" correction due to the discontinuous nature of the "Q" parity byte addresses relative to the rest of the array. "Q" parity generator 209 comprises two counters loaded with the initial values 2236 and 2288, respectively. After initialization, the two counters are incremented by two to provide the next pair of "Q" parity (ECC) bytes.

Figure 4:
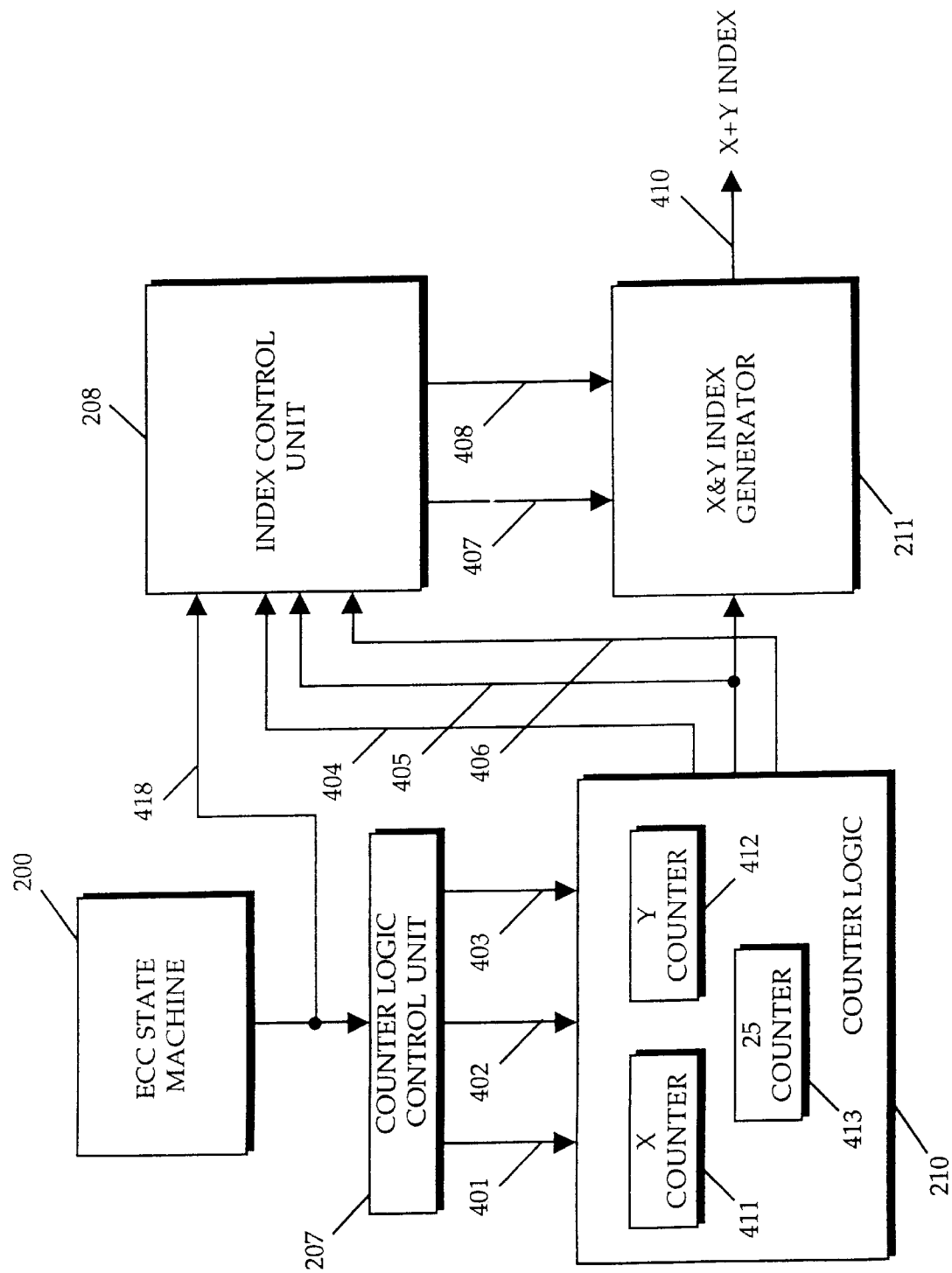
FIG. 4 is a block diagram of an embodiment of the address generating means of the present invention.

FIG. 4 is a more detailed block diagram of the circuitry responsible for controlling the X and Y index generation. ECC state machine 200 provides state information 418 to counter logic control unit 207 and index control unit 208. This state information indicates whether the current process is for the MSB or LSB plane, whether it is "P" or "Q" correction, and when to generate the next address. Counter logic 210, which comprises X counter 411, Y counter 412 and 25-counter 413, receives X counter control signals 401, Y counter control signals 402, and 25-counter control signals 403 from counter control logic 207, primarily to reset and increment the respective counters.

Counter logic 210 provides X counter value 404, Y counter value 405, and 25-counter value 406 to index control unit 208. Y counter value 405 is further provided to X and Y index generator 211. Index control unit 208 provides X index control signals 407 and Y index control signals 408 to X and Y index generator 211. X and Y index generator 211 provides the X+Y index value as output signal 410.

Figure 5:
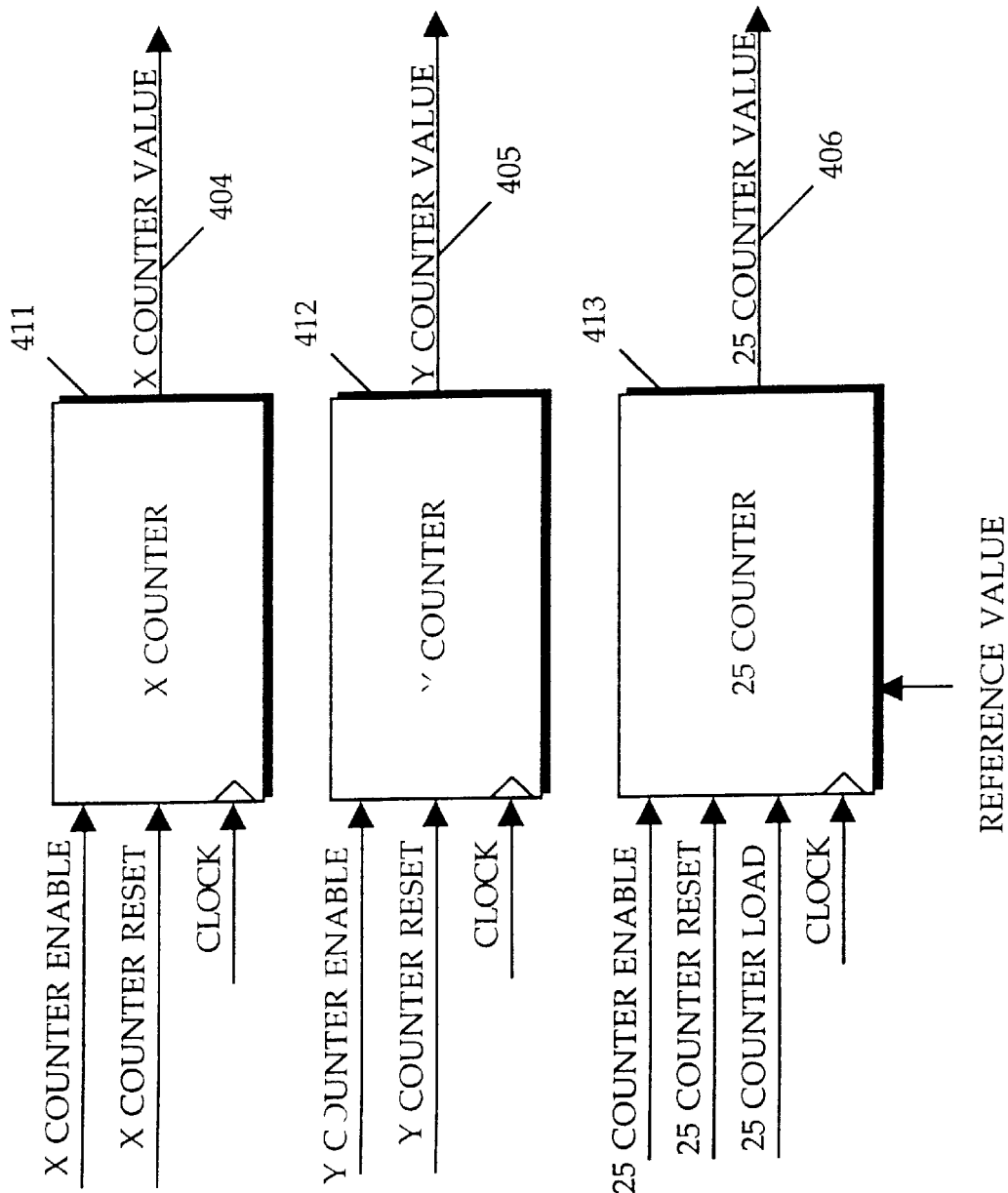
FIG. 5 is a block diagram of the counter logic for an embodiment of the address generating means of the present invention.

A block diagram of counter logic 210 is shown in FIG. 5. The X and Y counters act as row and column markers for the array, where as the 25-counter is used to provide the modulo function "roll-over" during "Q" correction. The 25-counter counts from zero to twenty-five and therefore provides the (M+1) or twenty-six count roll-over trigger.

X counter 411 receives an "X counter enable" signal and an "X counter reset" signal, and provides X counter value 404. The X counter enable and reset signals correspond to X counter control signals 401 from FIG. 4. Similarly, Y counter 412 receives a "Y counter enable" signal and a "Y counter reset" signal, and provides Y counter value 405. The Y counter enable and reset signals correspond to Y counter control signals 402 from FIG. 4. 25-counter 413 receives a "25-counter enable" signal, a "25-counter load" signal and a "25-counter reset" signal, as well as a "reference value", and provides 25-counter value 406. The 25-counter enable, load and reset signals correspond to 25-counter control signals 403 in FIG. 4. Each counter is clocked by the ECC/EDC system clock.

Each counter resets to zero when the respective reset signal is asserted. Further, each counter increments by one when the respective enable signal is asserted. However, the reset signal has priority over the enable signal. If the 25-counter load signal is asserted, then the "reference value" is loaded into the counter. If none of the control signals are asserted for any counter, then that counter value does not change for that clock cycle.

Combinational logic in counter logic control unit 207 responds to state machine 200 to increment, reset and load the counters when appropriate for code word address generation. The following is one possible control scheme which can be implemented in combinational logic. (It will be obvious that software running in a processor could provide equivalent control performance.)

---

(For "P" correction)
    Reset X and Y counters at start of correction.
    At "next address,"
        enable Y counter.
    When Y counter value = 25 (M), and "next address,"
        reset Y counter and enable X counter.
(For "Q" correction)
    Reset all counters at start of correction.
    At "next address,"
        enable Y counter and 25-counter.
    when Y counter value = 1, and "next address,"
        load 25-counter with reference value = X counter value.
    When Y counter value = 42 (N), and "next address,"
        reset Y counter and 25-counter, and enable X counter.
    When 25-counter = 25, and "next address,"
        reset 25-counter.

---

The loading of the 25-counter with the X counter value is done to provide "n'=[k(M+1)−m]/S=(26−X counter value)," as required for modulo roll-over. n will reach n' when the 25-counter value is twenty-five, which may occur twice as the X counter value increases. Other means for presetting a twenty-six state counter may also be used to provide n' to satisfy this condition.

Figure 6:
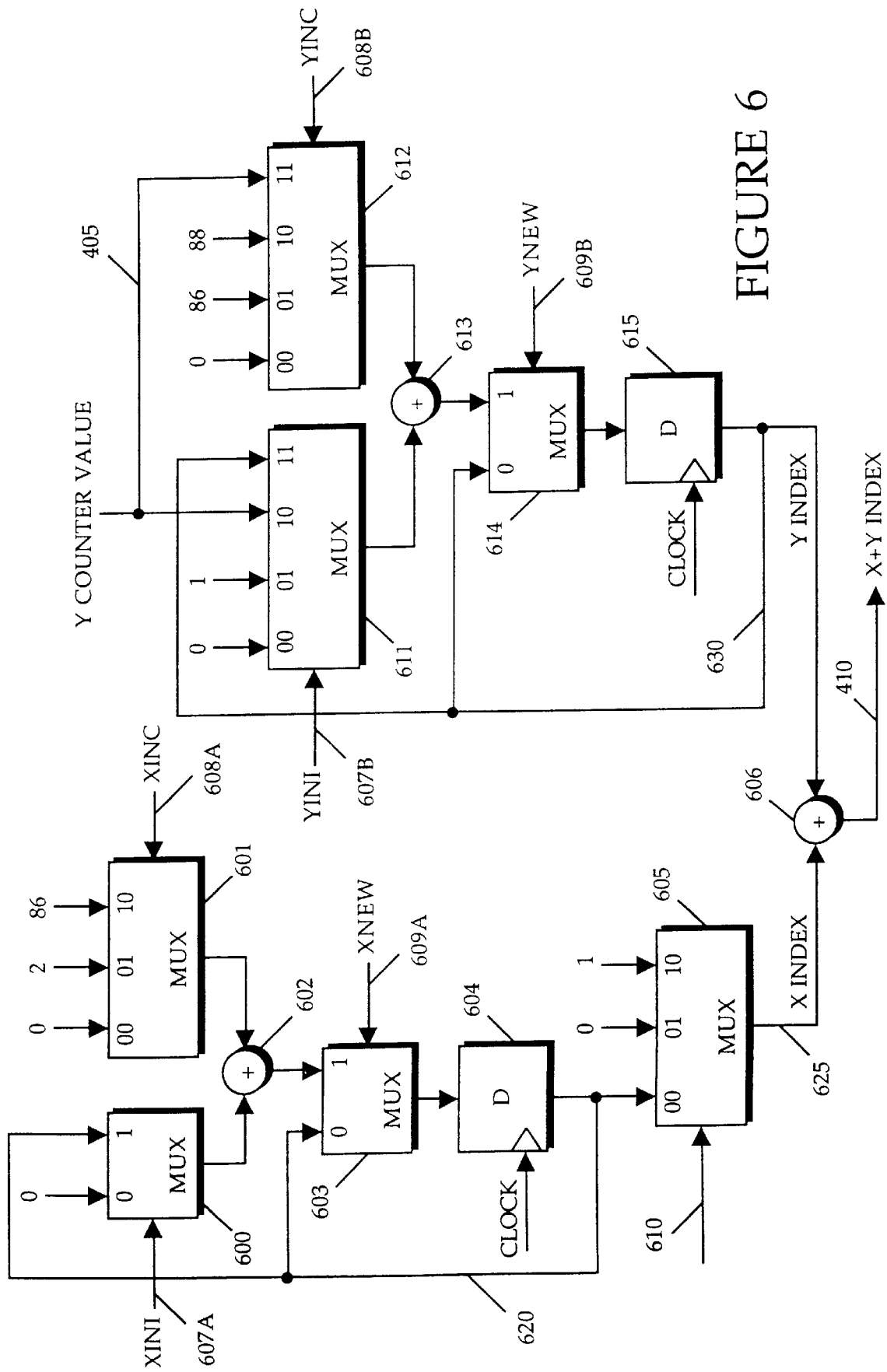
FIG. 6 is a block diagram of an X and Y index generator for an embodiment of the address generating means of the present invention.
Figure 7:
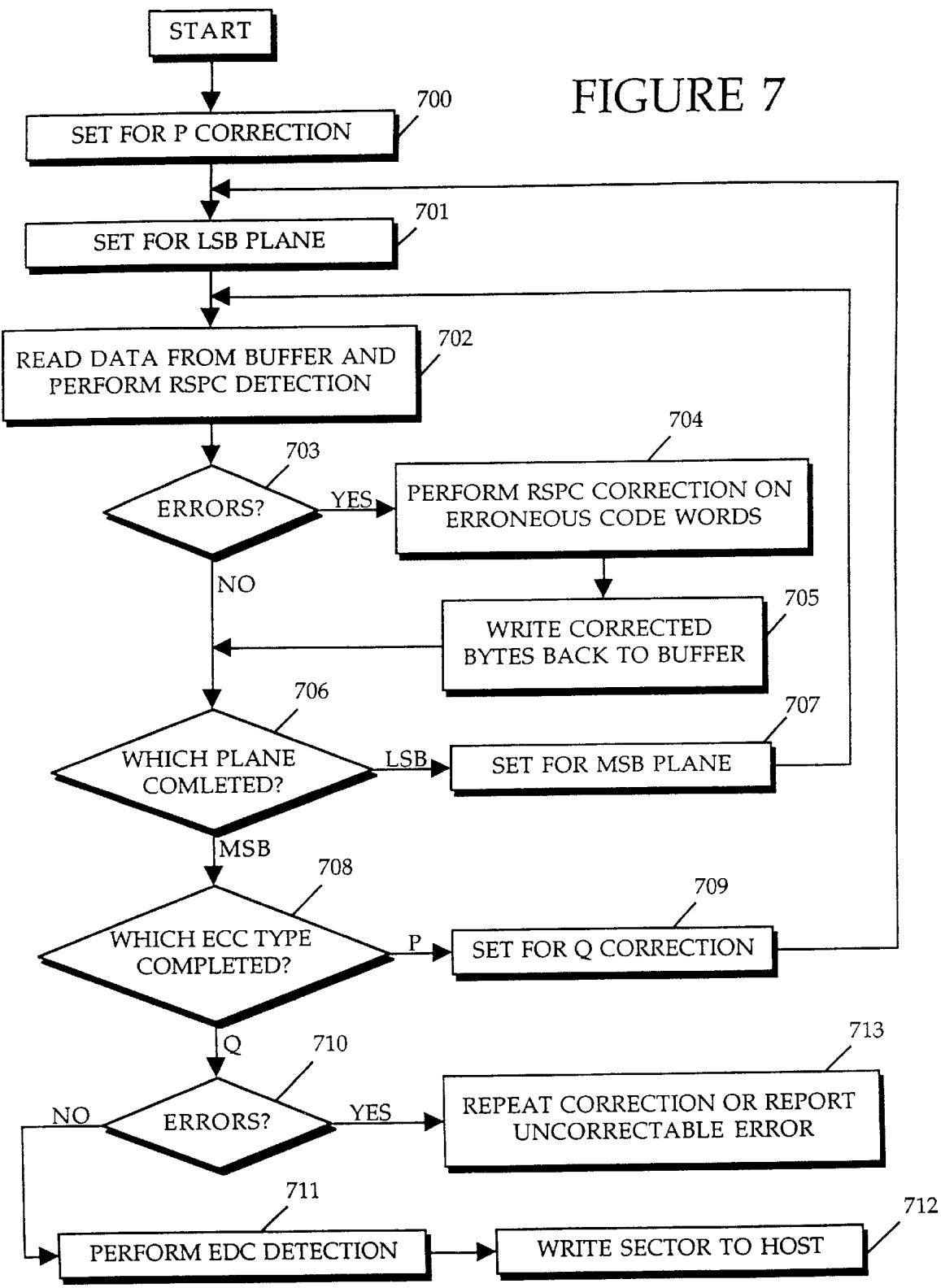
FIG. 7 is a flow diagram of the general ECC process in a CD-ROM drive.

FIG. 6 is a block diagram of an embodiment of the X and Y index generator used in the ECC/EDC circuit to provide the address index for elements of the "P" and "Q" code words. The X index generator comprises multiplexers 600, 601, 603 and 605, and register 604. The Y index generator comprises multiplexers 611, 612 and 614, and register 615. The X and Y index values are summed by adder 606 to generate X+Y index 410. Control signals 607A, 608A, 609A and 610 correspond to X index control signals 407 in FIG. 4. Control signals 607B, 608B and 609B correspond to Y index control signals 408 in FIG. 4.

In the X index generator of FIG. 6, multiplexer (MUX) 600 receives a zero value on the "0" input and X index feedback signal 620 on the "1" input Initialization signal XINI 607A is provided to multiplexer 600 as a select-signal. Multiplexer 601 receives a zero value on the "00" input, a value of two on the "01" input, and a value of eighty-six on the "10" input. Increment select signal XINC 608A is provided to multiplexer 601 as a select signal.

The output signals of multiplexers 600 and 601 are summed in adder 602, and the resulting sum is provided to the "1" input of multiplexer 603. The "0" input of multiplexer 603 receives X index feedback signal 620. Multiplexer 603 also receives signal XEW 609A as a select signal. Register 604 stores the output of multiplexer 603, and provides feedback signal 620 as an output. Multiplexer 605 receives feedback signal 620 on the "00" input, a zero value on the "01" input and a value of one on the "10" input. Signal 610 is provided to multiplexer 605 as a select signal. The output of multiplexer 605 is provided to adder 606 as X index 625.

In the Y index generator, multiplexer 611 receives a zero value on the "00" input, a value of one on the "01" input, Y counter value 405 on the "10" input and Y index feedback signal 630 on the "11" input. Initialization signal YINI 607B is provided to multiplexer 611 as a select signal. Multiplexer 612 receives a zero value on the "00" input, a value of eighty-six on the "01" input, a value of eighty-eight on the "10" input and Y counter value 405 on the "11" input. Increment select signal YINC 608B is provided to multiplexer 612 as a select signal.

The outputs of multiplexers 611 and 612 are provided to adder 613. The resulting sum is provided to the "1" input of multiplexer 614. Multiplexer 614 also receives feedback signal 630 on the "0" input. Signal YNEW 609B is provided as the select signal for multiplexer 614. Register 615 stores the output of multiplexer 614 and provides feedback signal 630 as an output signal. Feedback signal 630 is also provided to adder 606 as the Y index value.

Inputs "00"–"11" and "0"–"1" have been specified for multiplexers in FIG. 6 for illustrative purposes. It will be obvious that these input designations may be altered without departing from the scope of the invention, as long as the appropriate input value is selected by the respective select signal.

Multiplexer 600 provides for the initialization of the X index accumulator loop (blocks 600–604) to zero, hence the labeling of signal 607A as XINI. Multiplexer 601 provides for selection of either the "P" increment value of two or the "Q" increment value of eighty-six, hence the labeling of signal 608A as XINC. A zero input is provided to multiplexer 601 for initialization purposes. Multiplexer 603 is used to maintain the X index value between increments, permitting calculation of a new X index at the beginning of a new code word. Multiplexer 605 is used to implement the modulation function for the X index. When (n≧n') is true, the incrementing X index is not selected, and the MSB or LSB offset "A" (0 or 1) is selected in its stead.

Multiplexer 611 provides for the initialization of the Y index accumulator loop (blocks 611–615) to the MSB or LSB offset "A," hence the labeling of signal 607B as YINI. Multiplexer 612 provides for selection of an initial value of zero or for the "P" or "Q" increment values of "86" and "88,"respectively. Hence, signal 608B is labelled YINC.

Multiplexers 611 and 612 are further provided with an input equal to the Y counter value 405. During "Q" correction, when (n=n') is true, the Y counter value inputs provide the value of "2n" after summing in adder 613. The modulo function is thus accounted for. It is also possible to provide the function "2n" by selecting zero in either multiplexer 611 or 612 and providing a one-bit shifted Y counter value in the other multiplexer. The bit shift provides a multiplication of the value by two. Multiplexer 614 provides control of generation of a new Y index. In this embodiment, XNEW and YNEW signals are only a single clock period in duration to prevent undesired increment operations.

Figure 8:
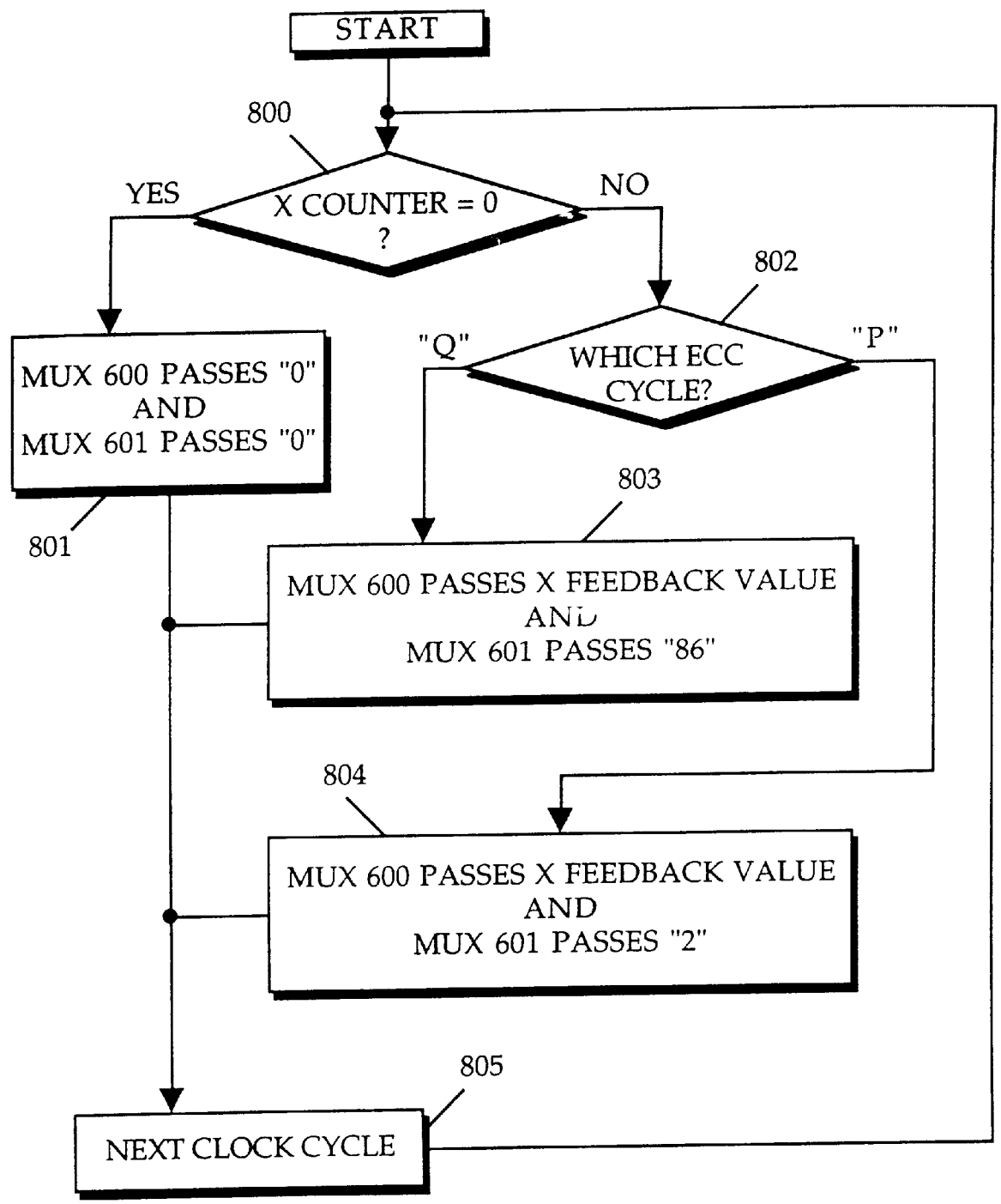
FIG. 8 is a flow diagram showing the signal selection routine for the X index generator.
Figure 9:
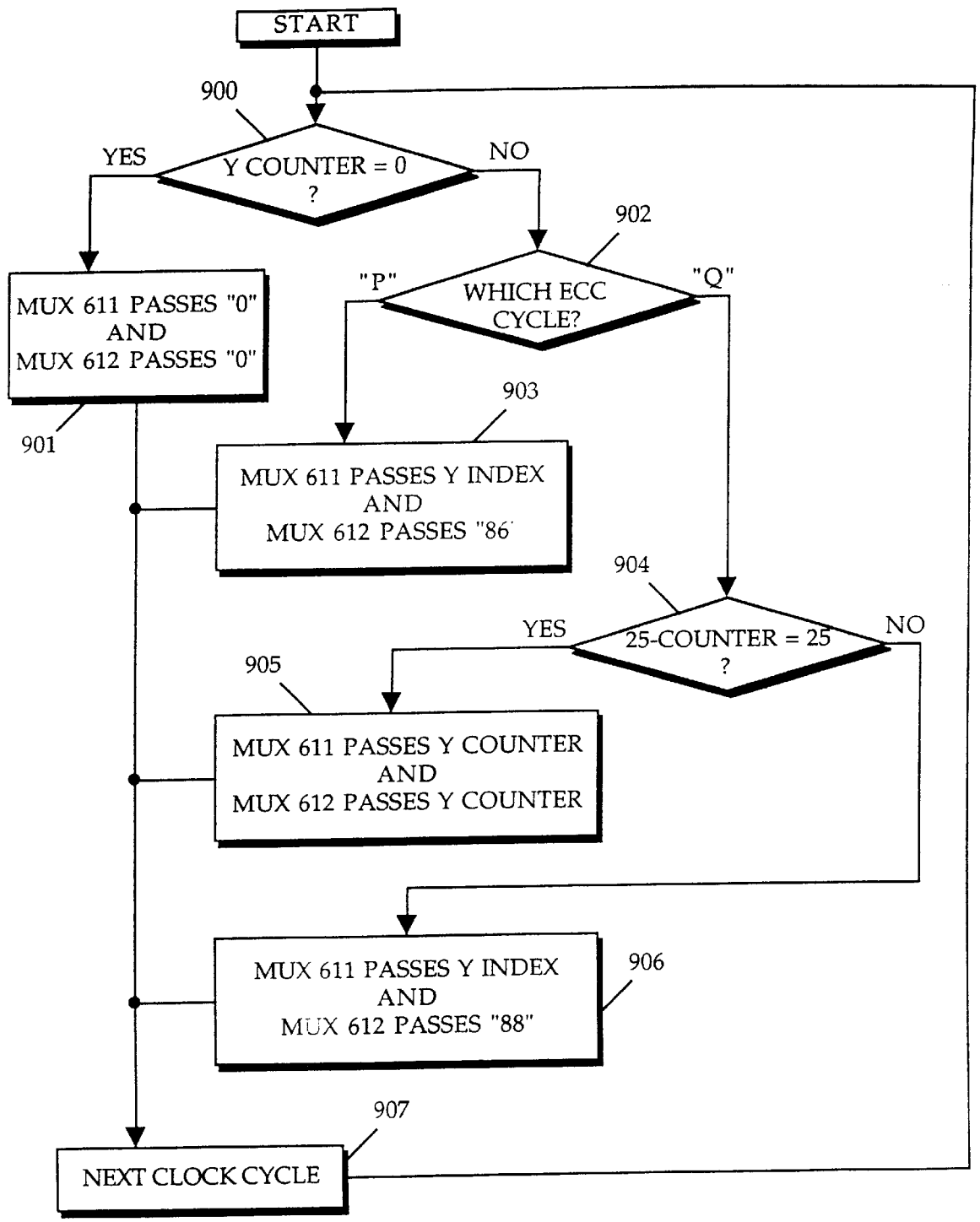
FIG. 9 is a flow diagram showing the signal selection routine for the Y index generator.

FIGS. 8 and 9 provide flow diagrams of how the initialization and increment multiplexer are controlled in the X index generator and Y index generator, respectively. Combinational logic in index control unit 208 responds to the counter values from counter logic 210 and state information from state machine 200 to control multiplexers 600, 601, 611 and 612 according to these flow diagrams. For synchronous logic, the flow control of FIGS. 8 and 9 can be considered to cycle once every clock period.

In FIG. 8, decision block 800 determines whether the X counter value is zero. If the X counter value is zero, then, in block 801, initialization multiplexer 600 and increment multiplexer 601 pass a zero value. However, if the X counter value is not zero, then, in decision block 802, a branching occurs based on which ECC cycle is currently being carried out.

If it is currently the "Q" correction cycle, then, in block 803, multiplexer 600 passes the X index feedback value, and multiplexer 601 passes "86." If it is currently the "P" correction cycle, then, in block 804, multiplexer 600 passes the X index feedback value, and multiplexer 601 passes "2." As indicated by block 805, after blocks 801, 803 or 804, the next dock cyde returns to decision block 800.

In FIG. 9, decision block 900 branches based on whether the Y counter value is zero. If the Y counter value is zero, then, in block 901, initialization multiplexer 611 and increment multiplexer 612 pass zero values. If the Y counter value is not zero, then, in block 902, another branching is made based on the current ECC cycle. If the current cycle is the "P" correction cycle, then, in block 903, multiplexer 611 passes the Y index value and multiplexer 612 passes "86." However, if the current cycle is the "Q" correction cycle, then another branching takes place in block 904 based on whether the 25-counter value is equal to twenty-five, i.e., whether it is currently a roll-over point.

If the 25-counter value is twenty-five, then, in block 905, multiplexers 611 and 612 pass the Y counter value. If the 25 counter value is not equal to twenty-five, then, in block 906, multiplexer 611 passes the Y index value, and multiplexer 612 passes "88." Blocks 901, 903, 905 and 906 lead to block 907. In block 907, at the next clock cycle, the process returns to decision block 900.

The XNEW signal (609A) is asserted for one clock cycle when the Y counter value is reset to zero and the state machine indicates readiness for the next address, i.e., at the beginning of a new code word. The YNEW signal (609B) is asserted for one clock cycle each time the state machine indicates readiness for a new address.

Signal 610 causes multiplexer 605 to pass the output of register 604 continuously during "P" correction, but during "Q" correction, signal 610 is conditioned on the 25-counter value and the Y counter value. From when the Y counter value is equal to zero until the 25-counter first reaches a value of twenty-five (i.e., from the beginning of a code word up to the roll-over point), signal 610 selects the output of register 604. However, when the 25-counter value reaches twenty-five, and until the Y counter value is reset to zero, signal 610 selects "0" for the LSB plane and "1" for the MSB plane.

The X+Y index signal 410 contains the relative array address for the desired code word element. Combining signal 410 and-other offset values provides the physical address in the buffer for the code word element. The logic required contains no complicated multipliers or modulo circuits that would require significant layout area and reduce generation speed. Significant area and power savings are realized, and address generation throughput is maximized.

Thus, a method and apparatus for generating addresses have been described.

What is claimed is:

1. An apparatus for generating a series of addresses for elements in an array comprising:
   a first index generator providing a first index to said array, said array being held resident in a memory medium;
   a second index generator providing a second index to said array;
   an adder receiving said first index and said second index and providing a summed index value, said summed index value comprising a relative address in said memory medium;
   wherein said series of addresses is a linear series in said array, said first index providing an index in a direction perpendicular to said linear series, and said second index providing an index in a linear direction of said linear series.

2. The apparatus of claim 1 wherein said apparatus provides addresses for a plurality of column vectors of said array.

3. The apparatus of claim 1 wherein said apparatus provides addresses for a plurality of diagonal vectors of said array.

4. The apparatus of claim 1 further comprising a control unit coupled to said first index generator and said second index generator, said control unit providing a first control signal configured to update said first index generator between each series of addresses, said control unit providing a second control signal configured to update said second index generator between each address in said series of addresses.

5. The apparatus of claim 4 further comprising a counter logic unit coupled to said control unit, said counter logic unit comprising a first counter associated with said first index generator and a second counter associated with said second index generator.

6. The apparatus of claim 5 wherein said counter logic unit further comprises a third counter for providing a modulo rollover indicator.

7. The apparatus of claim 5 further comprising a state machine coupled to said control unit and said counter logic unit, said state machine initiating and coordinating an address generation process.

8. The apparatus of claim 7 providing relative ECC code word addresses in a CD-ROM system, said state machine coordinating "P" and "Q" code word address generation.

9. The apparatus of claim 1 wherein at least one of said first index generator and said second index generator comprises:
   a multiplexer having a plurality of selectable inputs; and
   an accumulator coupled to said multiplexer, said plurality of selectable inputs comprising incrementing values for said accumulator.

10. The apparatus of claim 1 wherein said first index generator and said second index generator each comprise:
    a multiplexer having a plurality of selectable inputs; and
    an accumulator coupled to said multiplexer, said plurality of selectable inputs comprising incrementing values for said accumulator.

11. A method for generating a series of addresses for elements in an array comprising:
    generating a first index;
    generating a second index; and
    adding said first index and said second index to provide a summed index value;
    obtaining a relative address from said summed index, said relative address comprising a location in a memory medium;
    wherein said series of addresses is a linear series in the array, said first index providing an index in a direction perpendicular to said linear series, and said second index providing an index in a linear direction of said linear series.

12. The method of claim 11 wherein said method provides addresses for a plurality of column vectors of said array.

13. The method of claim 11 wherein said method provides addresses for a plurality of diagonal vectors of said array.

14. The method of claim 11 further comprising:
    updating said first index between each series of addresses; and
    updating said second index between each address in said series of addresses.

15. The method of claim 14 further comprising:
    controlling, with a first counter, said updating of said first index; and
    controlling, with a second counter, said updating of said second index.

16. The method of claim 15 further comprising indicating a modulo rollover with a third counter.

17. The method of claim 15 further comprising coordinating, with a state machine, said first and second counters and said updating of said first index and said second index.

18. The method of claim 17 wherein said method provides relative ECC code word addresses in a CD-ROM system, said state machine coordinating "P" and "Q" code word address generation.

19. The method of claim 11 wherein generating said first index comprises:
    accumulating said first index; and
    multiplexing a plurality of selectable inputs, said plurality of selectable inputs comprising incrementing values for accumulating said first index.

20. The method of claim 19 wherein generating said second index comprises:
    accumulating said second index; and
    multiplexing a plurality of selectable inputs, said plurality of selectable inputs comprising incrementing values for accumulating said second index.

21. An apparatus comprising:

an address generator, said address generator coupled to a memory medium and configured to generate a series of addresses for elements in an array, said array resident in said memory medium;

a first index generator providing a first index to said array;

a second index generator providing a second index to said array;

an adder receiving said first index and said second index and providing a summed index value, said summed index value comprising a relative address in said memory medium;

wherein said series of addresses is a linear series in said array, said first index providing an index in a direction perpendicular to said linear series, and said second index providing an index in a linear direction of said linear series.

22. The apparatus of claim 21 wherein said apparatus provides addresses for a plurality of column vectors of said array.

23. The apparatus of claim 21 wherein said apparatus provides addresses for a plurality of diagonal vectors of said array.

24. The apparatus of claim 21 further comprising a control unit coupled to said first index generator and said second index generator, said control unit providing a first control signal configured to update said first index generator between each series of addresses, said control unit providing a second control signal configured to update said second index generator between each address in said series of addresses.

25. The apparatus of claim 24 further comprising a counter logic unit coupled to said control unit, said counter logic unit comprising a first counter associated with said first index generator and a second counter associated with said second index generator.

26. The apparatus of claim 25 wherein said counter logic unit further comprises a third counter for providing a modulo rollover indicator.

27. The apparatus of claim 25 further comprising a state machine coupled to said control unit and said counter logic unit, said state machine initiating and coordinating an address generation process.

28. The apparatus of claim 27 providing relative ECC code word addresses in a CD-ROM system, said state machine coordinating "P" and "Q" code word address generation.

29. The apparatus of claim 21 wherein at least one of said first index generator and said second index generator comprises:

a multiplexer having a plurality of selectable inputs; and an accumulator coupled to said multiplexer, said plurality of selectable inputs comprising incrementing values for said accumulator.

30. The apparatus of claim 21 wherein said first index generator and said second index generator each comprise:

a multiplexer having a plurality of selectable inputs; and an accumulator coupled to said multiplexer, said plurality of selectable inputs comprising incrementing values for said accumulator.

31. A method for generating a series of addresses for elements in an array comprising:

generating a first index;

generating a second index; and adding said first index and said second index to provide a summed index value, said summed index value comprising a relative address in said memory medium;

wherein said relative address indicates an element in an array and said series of addresses is a linear series in said array, said first index providing an index in a direction perpendicular to said linear series, and said second index providing an index in a linear direction of said linear series.

32. The method of claim 31 wherein said method provides addresses for a plurality of column vectors of said array.

33. The method of claim 31 wherein said method provides addresses for a plurality of diagonal vectors of said array.

34. The method of claim 31 further comprising:

updating said first index between each series of addresses; and updating said second index between each address in said series of addresses.

35. The method of claim 34 further comprising:

controlling, with a first counter, said updating of said first index; and controlling, with a second counter, said updating of said second index.

36. The method of claim 35 further comprising indicating a modulo rollover with a third counter.

37. The method of claim 35 further comprising coordinating, with a state machine, said first and second counters and said updating of said first index and said second index.

38. The method of claim 37 wherein said method provides relative ECC code word addresses in a CD-ROM system, said state machine coordinating "P" and "Q" code word address generation.

39. The method of claim 31 wherein generating said first index comprises:

accumulating said first index; and multiplexing a plurality of selectable inputs, said plurality of selectable inputs comprising incrementing values for accumulating said first index.

40. The method of claim 39 wherein generating said second index comprises:

accumulating said second index; and multiplexing a plurality of selectable inputs, said plurality of selectable inputs comprising incrementing values for accumulating said second index.

* * * * *